United States Patent

[11] 3,614,378

| [72] | Inventors | Stuart E. Goodell<br>Playa Del Rey;<br>Gerald R. Stoeckinger, Los Angeles, both of Calif. |
|---|---|---|
| [21] | Appl. No. | 880,737 |
| [22] | Filed | Nov. 28, 1969 |
| [45] | Patented | Oct. 19, 1971 |
| [73] | Assignee | McDonnell Douglas Corporation |

[54] FLUXLESS HIGH-FREQUENCY ALUMINUM TUBE WELDING WITHOUT INSERTS
4 Claims, 3 Drawing Figs.

[52] U.S. Cl. .................................................. 219/137,
219/61, 219/75, 219/131
[51] Int. Cl. .............................................. B23k 9/00
[50] Field of Search ........................................ 219/137,
131, 118, 75, 74, 61

[56] References Cited
UNITED STATES PATENTS

| 2,716,692 | 8/1955 | Williams et al. | 219/61 |
| 2,747,065 | 5/1956 | Diehl | 219/61 X |
| 2,761,047 | 8/1956 | Meredith | 219/137 X |
| 2,764,668 | 9/1956 | Dumoulin | 219/137 |
| 2,787,699 | 4/1957 | Jessen | 219/137 |
| 3,068,352 | 12/1962 | Correy | 219/137 |

*Primary Examiner*—J. V. Truhe
*Assistant Examiner*—George A. Montanve
*Attorneys*—Walter J. Jason, Donald L. Royer and Robert O. Richardson

ABSTRACT: A method of fillerless butt welding hot crack sensitive aluminum tubing with high-frequency current pulsation with continuous pressure purging as a means of eliminating flux and improving weld bead contour.

INVENTORS
STUART E. GOODELL
GERALD R. STOECKINGER
BY Robert O. Richardson
— ATTORNEY —

3,614,378

FLUXLESS HIGH-FREQUENCY ALUMINUM TUBE WELDING WITHOUT INSERTS

BACKGROUND OF THE INVENTION

The welding of aluminum first requires the removal of aluminum oxide which causes an increase in surface tension and porosity and inhibits the welding together of the parts sought to be welded. A nonmetal chlorine or fluorine base flux is usually used to break up the aluminum oxide and to permit wetting or cohesion to occur in the weld. This requires applications of the flux to the joint and it becomes a source of contamination because of the organic compounds needed to reduce the oxide. The flux is corrosive and is not always compatible with the environment to which it is exposed. Post flushing is necessary to wash down and clean out the welded area. This is laborious, time consuming, costly and does not provide assurance that all contamination is removed. Drying time after flushing is also needed.

U.S. Pat. No. 3,378,914 discloses a method of fluxless aluminum brazing by exposing the parts to the action of magnesium vapor generated during brazing. A deoxidizing braze filler, such as silicon, is used in the method disclosed by U.S. Pat. No. 3,370,343. In butt welding of aluminum tubing, a filler or insert was used with a low-frequency-welding current. In particular, a filler known as 4043 aluminum, with a 5 percent silicon content was used in welding 6061 aluminum, the latter being a heat treatable crack-sensitive material. The silicon filler in small amounts aided the weld flow since it combined with the 0.5 percent silicon content in the 6061 aluminum. However, when used excessively, silicon reduced the weld strength and made the weld more brittle. Silicon eliminated the hot cracking tendency (contraction stresses while the weld puddle is solidifying) but increased the porosity of the aluminum. Silicon is considered "dirty" since it causes contamination in the weld.

SUMMARY OF THE PRESENT INVENTION

In accordance with the present invention, a fillerless-fluxless butt weld of crack-sensitive aluminum tubing in a single pass full penetration welding operation is accomplished by use of a purging gas under pressure and with the use of high-frequency current pulsations (on the order of 4KC and higher) to relieve the damaging effect of residual stresses upon solidification of the weld puddle. Cracking while metal was in the plastic temperature range was eliminated as was the need for flux, the use of sleeves, reinforced weld lands, and inserts. In free-fall welding where no inner support is used, the weld penetration is not excessive so as to restrict the inside diameter of small tubing and the weld root has a uniform geometry around the tube. The positive pressure of the inert gas within the tube during welding feathers the weld drop-through and changes the shape of the root bead from a notch configuration which generates fatigue cracking under vibration. Fluid flow turbulence around the weld is reduced. The outer weld face is convex instead of concave, enhancing the weld strength without the need for a reinforced weld land or insert to serve as filler. Welds made in accordance with the present invention withstand higher burst pressures, have a higher fatigue life and generally are of better quality than those previously made.

BRIEF DESCRIPTION OF DRAWING

Referring now to FIG. 1 there is shown, in section, two tubes 10, 12 to be butt welded. Their abutting surfaces 14, 16 are first mechanically cleaned, such as by scraping. In the butt-welding method to be used, a ring gear 18 is positioned around the abutting ends of tubes 10, 12 and rotates the welding electrode 20 around the tubes in a circumferential path. This ring gear is driven by pinion 22 which is programmed for selected velocities to control the electrode travel rate as desired.

Figure 1:
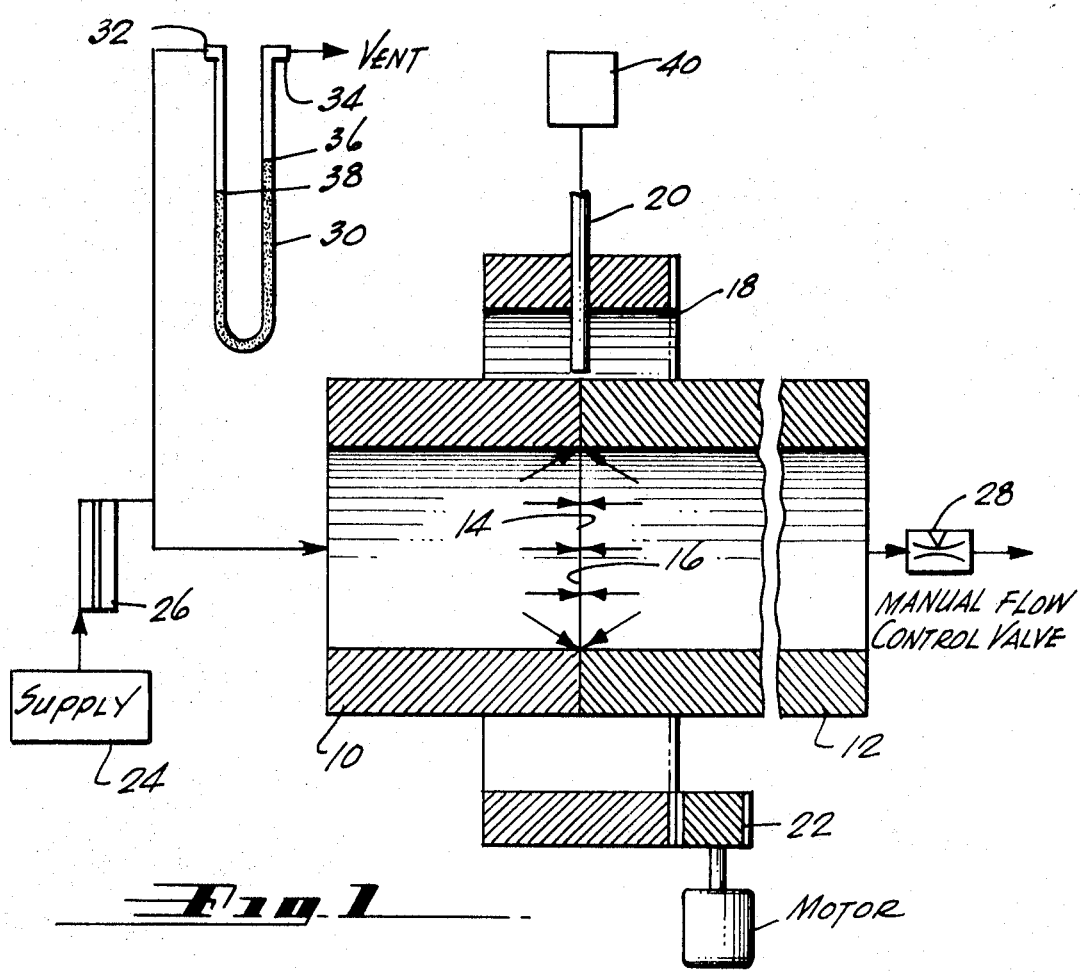
FIG. 1 is a schematic illustration of the apparatus used in the practice of the invention.

In the practice of this invention, a purging gas, such as argon or helium, is passed through the tube under pressure. For this purpose, a gas supply 24 is provided with a flowmeter 26 in its path to the tube 10. A manual flow control valve 28 is provided in the exit path in order to cause a buildup of pressure. If the tube has a sufficiently long flow path, it provides its own flow restriction, such that the valve 28 in selected applications is not needed to ensure the buildup of pressure. Pressure is measured with a water manometer 20 having one end 32 connected to the gasline and the other end 34 vented to atmosphere. Pressure may be determined by reading the water levels 36 and 38 within the U-shaped tube. A draft gauge may also be used for this purpose. Two inches of water pressure for one-fourth inch OD aluminum tubing and 0.25 inches of water pressure for three-fourths inch OD has been found to be adequate pressures.

The welding current is supplied to electrode 20 from a power supply 40 which in this case delivers a 16 volt 50 amp. current pulsating on the order of, or in excess of, 4 kilocycles. A power level of 750 to 1,000 watts delivered to the electrode is preferred. Prior to the welding sequence, the inert purge gas supply is opened and the desired flow rate in cubic feet per hour is set. The inert gas is then given a positive pressure by adjusting the manual flow controlled throttle valve 26 and the pressure measured with the use of the water manometer or draft gage 30. After the desired pressure is stabilized and the preflow time has been achieved, the actual welding sequence begins. Single pass full penetration welding of aluminum is best performed with the timing and pulsed direct current variation set forth in copending application, Ser. No. 691,382, now U.S. Pat. No. 3,522,412. At the conclusion of the weld cycle, the desired post-flow period is then maintained at which time the purging operation is complete.

Figure 2:
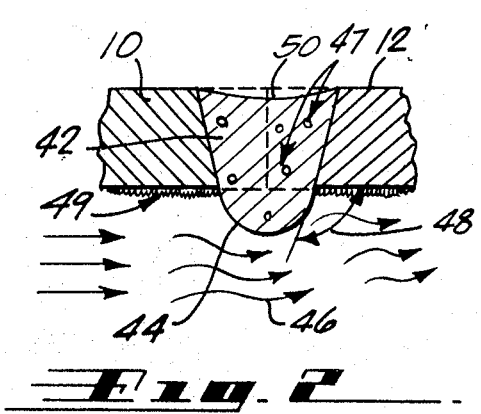
FIG. 2 is a sectional view of a prior art weld.

FIG. 2 shows a typical weld in accordance with state of the art methods in butt-welding ends of aluminum tubes 10 and 12 in a single pass full penetration method. Here the weld 42 is shown with a considerable drop-through root 44 which occurs when no internal support of any kind is used. This root causes a turbulence of the flowing medium due to the excessive penetration. Such turbulence is shown by the lines 46. As can be seen by the double arrow 48, this root makes a dihedral angle of approximately 115° with the inner wall of tube 12. This results in a notch which promotes stress concentration and eventual fracture during fatigue from vibration and is therefore considered to be undesirable. On the outer surface there is a concavity of the face 50 which results in a weakness of the joint due to a reduced section thickness. The weld metal is contaminated with porosity and inclusions 47 due to the presence of flux 49 previously applied to the internal diameter of the tube. Contamination of the weld is also introduced by the presence of the consumable insert filler metal 42 which is required to inhibit hot cracking of the weld.

Figure 3:
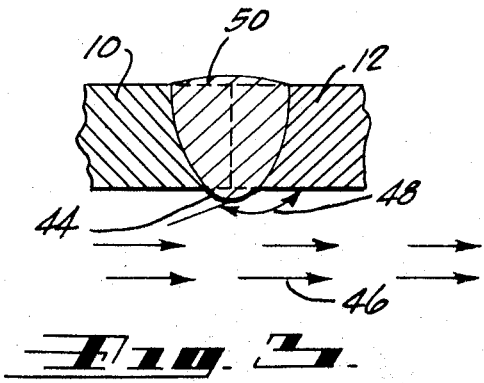
FIG. 3 is a sectional view of a weld made in accordance with the present invention.

Reference is now made to the sectional view in FIG. 3 which shows in contrast puddle control through the use of a positive pressure from the purge gas within the tube. Here tube ends 10 and 12 have been welded without filler metal in accordance with the present invention and it can be seen that the reduced penetration of root 44 permits a smoother contour which minimizes turbulence and restriction of the flowing medium, shown by arrows 46. A higher dihedral angle shown by double-pointed arrow 48 reduces the notch sensitivity, and convexity of outer surface 50 is prevalent, resulting in improved strength of the overall joint.

Frequency pulsation of the welding current combined with positive pressure purging permits single pass full penetration crack free fusion welding of crack-sensitive aluminum alloy tubing without the need of a weld filler or internal support. Enough agitation is induced in the weld puddle to eliminate the need to remove aluminum oxide on the interior and exterior of the tube ends, although the faying surfaces still require mechanical removal of aluminum oxide. Additional advantages in practicing the present invention include the elimination of notch sensitivity due to the new root bead contour, a reduction in porosity, a less restrictive fluid flow, longer fatigue life, improved tensile strength, and resistance to higher burst pressures, all resulting in a better quality weld than previously obtainable. Other advantages, as well as modifications and improvements in the techniques in the practice of the present invention, will occur to those skilled in the art, and it is to be understood that these modifications and deviations from the embodiment just described are to be considered as part of the present invention.

We claim:

1. A method of welding crack-sensitive aluminum alloy tubing without use of flux, fillers and inserts comprising the steps of:

cleaning the ends of tubes to be welded together, placing said ends in abutting contact, passing an inert purging gas through said tubes in a continuous flow past the abutting ends at sufficient pressure to prevent excessive dropthrough of the weld puddle formed along the abutting ends during welding and to ensure a uniform geometry of weld around the tube, energizing an electrode with pulsed direct current of a frequency of at least 4KC and at a power level sufficient for full penetration of the tube walls to provide a weld puddle and to agitate said weld puddle to relieve damaging effect of residual stresses therein, and completing the weld by passing said electrode once around said tubes in a weld path along the abutting ends of said tubes.

2. The method set forth in claim 1 wherein said tubes are ¼ inch OD and the pressure is approximately 2 inches of water.

3. The method as set forth in claim 1 wherein said tubes are ¾ inch OD and the pressure is approximately ¼ inch of water.

4. The method as set forth in claim 1 wherein a power level of from 750 to 1,000 watts is delivered to the electrode.

PO-1050
(5/69)

UNITED STATES PATENT OFFICE
CERTIFICATE OF CORRECTION

Patent No. 3,614,378            Dated    19 October 1971

Inventor(s) Stuart E. Goodell, Gerald R. Stoeckinger

It is certified that error appears in the above-identified patent and that said Letters Patent are hereby corrected as shown below:

In Column 2, Line 11, "20" should read 30.

Signed and sealed this 16th day of May 1972.

(SEAL)
Attest:

EDWARD M. FLETCHER, JR.            ROBERT GOTTSCHALK
Attesting Officer                      Commissioner of Patents